United States Patent [19]

Jantzen

[11] Patent Number: 4,671,011

[45] Date of Patent: Jun. 9, 1987

[54] HEAT GAIN AND RETENTION STRUCTURE, PARTICULARLY A COLD FRAME

[76] Inventor: Michael E. Jantzen, Box 217, Carlyle, Ill. 62231

[21] Appl. No.: 787,608

[22] Filed: Oct. 15, 1985

[51] Int. Cl.$^4$ .......................... A01G 9/00; A01G 13/00
[52] U.S. Cl. .......................................... 47/18; 47/19; 47/26; 47/29; 47/33; 428/35
[58] Field of Search ................. 428/35; 47/18, 19, 26, 47/29, 33

[56] References Cited

U.S. PATENT DOCUMENTS

| | | | |
|---|---|---|---|
| 2,777,253 | 1/1957 | Bensin | 47/1 |
| 3,128,508 | 4/1964 | Burnham . | |
| 3,129,530 | 4/1964 | Anderson | 47/19 |
| 3,321,864 | 5/1967 | Stasiuk | 47/19 |
| 3,946,521 | 3/1976 | Ours | 47/28 R |
| 4,005,547 | 2/1977 | Caldwell | 47/28 R |
| 4,014,133 | 3/1977 | Brown . | |
| 4,242,833 | 1/1981 | Maes, Jr. . | |
| 4,249,340 | 2/1981 | Maes, Jr. | 47/17 |
| 4,367,726 | 11/1983 | Maes, Jr. . | |
| 4,429,489 | 2/1984 | Fischer | 47/18 |

FOREIGN PATENT DOCUMENTS 2907344 8/1980 Fed. Rep. of Germany .
3114952 11/1982 Fed. Rep. of Germany .
2293871 8/1976 France .

OTHER PUBLICATIONS

"House and Garden" magazine, (Oct. 1975, Aug. 1977).
"Solar Age" magazine, (Oct. 1976).
"Organic Gardening", (Jan. 1977).

Primary Examiner—John L. Goodrow
Assistant Examiner—Patrick J. Ryan
Attorney, Agent, or Firm—Polster, Polster & Lucchesi

[57] ABSTRACT

An insulated cold frame includes an insulated box having an upwardly extending insulated rear wall and a rigid insulated cover rotatable about a horizontal axis from a sealed position to a fully open position. A glazing cover inside the insulated cover permits light to reach the interior of the cold frame and provides a heat gain during daylight hours when the insulated cover is open. The glazing cover is rotatable about substantially a common axis with the insulated cover to provide ventilation and temperature control.

20 Claims, 15 Drawing Figures

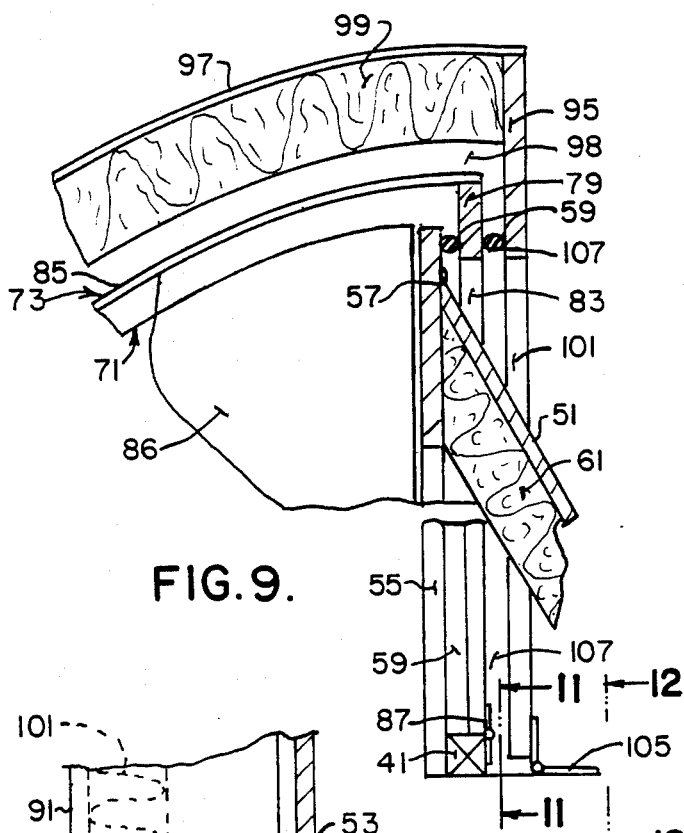
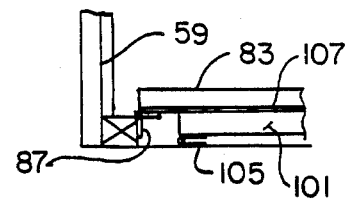
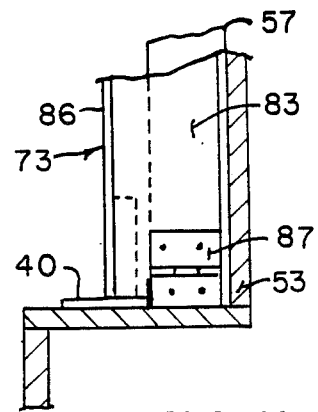
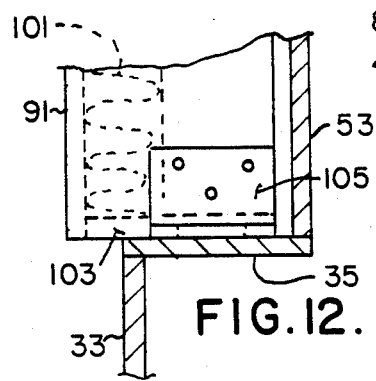
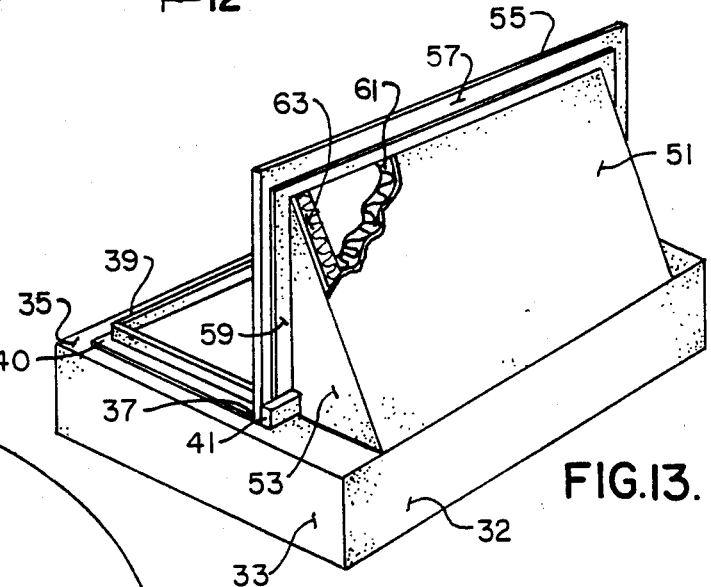
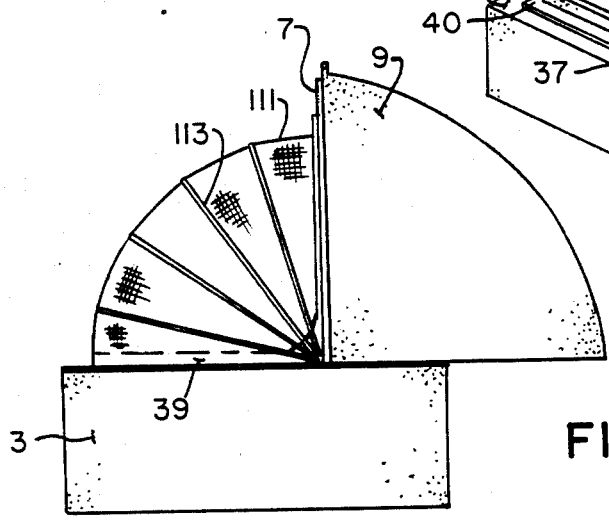

HEAT GAIN AND RETENTION STRUCTURE, PARTICULARLY A COLD FRAME

BACKGROUND OF THE INVENTION

This invention relates to a heat-gain structure. It is illustrated as a high efficiency cold frame, although its usefulness is not limited thereto.

The need for providing a structure which will increase the growing season for plants has been long felt. One structure for prolonging the growing season is the cold frame or hot bed.

A cold frame consists of a frame and a cover glazed with a light-transmitting material. The cold frame provides a heat gain during daylight, even on most cloudy days, and provides some retention of heat during cold and sunless periods. Cold frames, however, have a number of well-known drawbacks.

On sunny days, cold frames tend to overheat, even in very cold weather. To overcome this problem, temperature responsive openers have been used, as shown, for example, in Anderson, U.S. Pat. No. 3,129,530, and in Caldwell, U.S. Pat. No. 4,005,547. This expedient has not been entirely successful, because opening the cold frame sufficiently to let the heat out has sometimes permitted cold wind to freeze plants, especially near the edges of the cold frame.

Wind causes other problems with cold frames. When the glazing is laid back to open the frame, it is subject to being blown away and broken by the March or October wind. If the glazing is hinged to the frame, it may well carry the entire frame with it or deform the hinges or frame. When the glazing is partially opened, either manually or by an automatic opener, it is even more subject to being caught by the wind than when it is laid back on the ground.

Cold frames are also not particularly efficient heat retainers. On cold nights, the plants within them are frequently damaged. To prevent heat loss, a blanket of insulation is sometimes placed over the cold frame, and a water-resistant sheet is placed over the blanket. The blanket and sheet must then be secured against wind, because if even a corner of the blanket blows loose, its insulation value is largely lost.

The time and physical effort required to manipulate cold frames during harsh weather, as well as their limited effectiveness, has limited their use.

Hot beds are essentially cold frames with a supplemental source of heat, either from an outside energy source or from decaying matter. Although they reduce the problem of freezing, they are inefficient users of energy and suffer all of the other problems associated with cold frames.

Greenhouses are much larger, hence much more expensive, than cold frames. An unheated greenhouse loses heat rapidly. A heated greenhouse requires great amounts of energy to provide supplemental heating at night, during cloudy or extremely cold weather. The cost of energy for heating greenhouses has become a serious problem. Various methods for insulating greenhouses have been proposed, but they have generally been so expensive or cumbersome that they have not been widely adopted.

SUMMARY OF THE INVENTION

One of the objects of this invention is to provide a growth chamber which provides all of the functional advantages of a cold frame, and which overcomes the problems of heat loss, overheating, wind damage to the plants within the chamber, and wind damage to the structure.

Another object is to provide such a growth chamber which is strong, yet easy to install and move.

Another object is to provide such a growth chamber which is easily and quickly manipulated for controlling temperature and light within the chamber.

Another object is to provide such a growth chamber which is far more attractive than conventional cold frames.

Another object is to provide such a growth chamber which permits easy screening against insects or for shade during hot weather.

Another object is to provide such a growth chamber which provides far more vertical growing space than a conventional cold frame, and which may be used for growing a wide variety of plants to maturity if desired.

Another object is to provide such a growth chamber having a cover which is more compact than a conventional cold frame, particularly when it is opened.

Another object is to provide such a growth chamber which is highly resistant to rain, snow and hail.

Another object is to provide an insulated chamber having wider uses than a cold frame.

Another object is to provide a system of insulated chambers which may be accessed without exposing the chambers to the ambient.

Other objects of this invention will be apparent to those skilled in the art in light of the following description and accompanying drawings.

In accordance with one aspect of this invention, generally stated, an insulated chamber is provided comprising an insulated box; a fixed, insulated, upstanding rear wall on the box; and an insulated cover moveable between a closed position in which the insulated cover forms a seal with the upstanding rear wall and with the box to form a closed, insulated chamber, and an open position in which the upstanding rear wall is exposed to ambient light to reflect light into the box. Preferably, the upstanding rear wall slopes upwardly forward. The insulated chamber further includes a light-transmitting glazing cover within the insulated cover. The glazing cover is substantially air-impermeable and is moveable between a closed position in which the glazing cover forms a seal with the upstanding rear wall and with the box to form a closed, insulated chamber and an open position in which the interior of the box is exposed to ambient atmosphere.

Preferably, a part of the glazing cover and gasketing are interposed between the insulated cover and the upstanding wall when the insulated cover is closed.

The insulated cover is preferably formed as a rigid section of a cylinder having a generally horizontal axis, and the cover is pivotable about the generally horizontal axis between the closed position and the open position. Preferably, the insulated cover includes a rigid, weather-resistant outer layer and an insulative inner layer.

In the preferred embodiment, the glazing cover is formed as a rigid section of a cylinder, and the cover is pivotable about substantially the same axis as the insulated cover between the closed position and the open position. In a partially open position, the glazing cover is cracked open at the front of the box and at the top of the upstanding wall to provide flow-through ventilation.

In the preferred embodiment, the insulated chamber is a cold frame, and growing plants are in the chamber. The box includes an insulated bottom, and a heat-retaining material fills a substantial part of the box.

In accordance with another aspect of the invention, an insulated chamber is provided comprising an insulated box having an open top; a rigid, insulated cover moveable between a closed position in which the insulated cover closes the open top to form a closed, insulated chamber, and an open position; and a light-transmitting glazing cover within the insulated cover, the light-transmitting glazing cover being capable of closing the chamber when the insulated cover is in the open position.

Preferably, the glazing cover is substantially air-impermeable, the glazing cover being moveable between a closed position in which the glazing cover forms a seal with the upstanding rear wall and with the box to form a closed, insulated chamber, and an open position in which the interior of the box is exposed to ambient atmosphere. The insulated cover is formed as a rigid section of a cylinder having a generally horizontal axis, and the cover is pivotable about the generally horizontal axis between the closed position and the open position.

In accordance with another aspect of the invention, an insulated chamber is provided having an access pod. The chamber includes an insulated cover moveable between a closed position and an open position and a glazing cover within the insulated cover, the glazing cover being moveable between a closed position and an open position, the chamber having a front face including the insulated cover and the glazing cover. The access pod is of sufficient size to accommodate a human. The pod is mateable with the front face of the insulated chamber to close the chamber when the insulated cover and the glazing cover are in the open positions, the insulated cover and the glazing cover being reachable from the pod for opening and closing the insulated cover and the glazing cover from the pod. The pod is moveable away from the chamber front face to expose the insulated cover. Preferably, a plurality of the chambers are aligned end-to-end in a row, the pod being moveable along a track parallel with the row from chamber to chamber. Preferably, the chambers are cold frames including heat-retaining material and growing plants in the chambers.

Other aspects of the invention will be better understood in light of the following description of the preferred embodiment of the invention.

BRIEF DESCRIPTION OF THE DRAWINGS

In the drawings,

FIG. 9 is an enlarged detail of FIG. 8, partially broken away, showing the interengagement of an upstanding rear wall, the insulative cover, and the glazing cover and also showing details of the hinging of the insulative cover and the glazing cover.

FIG. 10 is an enlarged detail corresponding to FIG. 9 showing the hinging of the insulative cover and the glazing cover when both are in an open position.

FIG. 11 is a sectional view taken along the line 11—11 of FIG. 9, showing details of a glazing cover hinge.

FIG. 12 is a sectional view taken along the line 12—12 of FIG. 9, showing details of an insulated cover hinge.

FIG. 13 is a view in rear perspective of an insulated box portion and an upstanding wall portion partially broken away, of the cold frame of FIGS. 1-12, with the insulative cover and glazing cover removed.

FIG. 14 is a view in right side elevation, corresponding to FIG. 7, showing a second embodiment of cold frame in accordance with the present invention, this embodiment including a flexible netting.

DESCRIPTION OF THE PREFERRED EMBODIMENT

Figure 1:
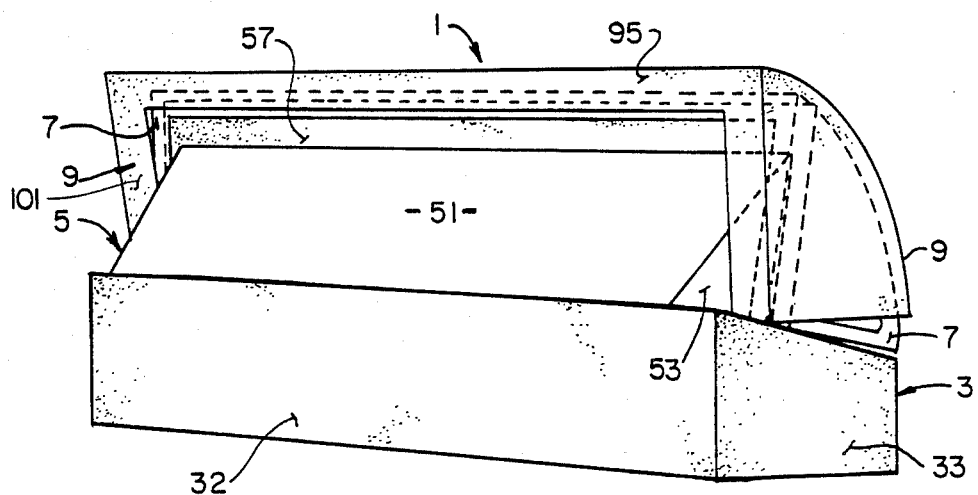
FIG. 1 is a view in perspective, from the rear or north side, of one illustrative embodiment of cold frame of the present invention, an insulative cover and a glazing cover of the cold frame being cracked open for illustration.

Referring now to the drawings, reference numeral 1 indicates a cold frame embodying one illustrative embodiment of heat gain and heat retention structure of the present invention. The cold frame 1 includes an insulated box 3, an upstanding insulated rear wall 5, a glazing cover 7 and an insulated cover 9.

The illustrative cold frame 1 is approximately eight feet long, four feet deep, and four-and-a-half feet tall. It is positioned to face south (in the northern hemisphere), to receive the rays of the winter sun.

The box 3 is made of three-quarter inch pressure-treated plywood. It is eighteen inches tall. It includes identical front and rear walls 31 and 32 respectively and identical end walls 33. The box 3 has an open bottom.

A sill 35 is provided around the top of the box 3. The sill 35 is four inches wide across its front and the forward parts of its sides. At shoulders 37, the sill 35 widens to five-and-one-half inches wide along the rearward sixteen inches of the sides, for purposes which will hereinafter become apparent. The sill 35 is four-and-one-half inches wide across the rear of the box 1.

Along the corners of the box 3, the plywood is supported by 2×2 studs in accordance with standard construction practices.

An upstanding lip 39 is provided around the interior edge of the sill 35, along the front and major portion of the sides, back to the shoulders 37. A gasket 40 is applied to the upper face of the sill adjacent and along the lip 39. At the shoulders 37, blocks 41 are mounted to the top of the sill 35, for mounting the glazing cover 7. The blocks 41 are one-and-one-half inches tall, one-and-three-quarters inches long, and one inch deep.

The box 3 is placed on the ground and three-inch thick water-resistant foam insulation slabs 42, 43, 44 and 45 are placed on the ground and inside the walls 31, 32 and 33, respectively. Strips of insulation 46 are placed under the sill 35, particularly under the widened portions. The box is thereby completely insulated except for the opening defined by the sill 35.

The box is filled to within three inches of the sill 35 with a thermal mass 47, such as earth, or water-filled bottles covered with gravel, or gravel. Plants 48 are placed on or in the thermal mass 47.

The upstanding rear wall 5 includes a forwardly sloping wall 51, a pair of triangular side supports 53 and a face plate 55, all formed of three-quarter inch pressure-treated plywood.

The sloping wall 51 is about seven feet long and thirty-two inches high. The triangular supports 53 are twenty-eight inches high and sixteen inches deep. The face plate 55 includes two uprights having a width of five-and-one-half inches and a cross-piece having a height of nine inches. The face plate is sized to be about one-and-one-half inches larger than the sloping wall 51 and triangular supports 53, to leave an inverted U-shaped vertical planar margin 57 on its rear face. The glazing cover 7 mates with the margin 57, as described hereinafter. A gasket 59 is applied around the rear face of the margin 57.

The inside faces of the sloping wall 51 and the triangular side supports 53 are insulated with three inch thick waterproof foam insulation sheets 61 and 63, respectively. The insulation is given a reflective coating.

The glazing cover 7 is formed as an open frame 71 covered with a bendably rigid transparent glazing 73 on its front and side walls. The glazing cover 7 is shaped as a quarter cylinder.

Preferably, the glazing 73 is a double-walled plastic material, of one of the types which are widely commercially available. An example of such a glazing material is a quarter-inch thick acrylic clad polycarbonate material, sold by General Electric Company, Plastics Division, under the trademark Lexan Thermoclear.

The frame 71 is made from three-quarter inch pressure-treated plywood. It includes a pair of 90° sector end plates 75, a horizontal forward support 77 joining the end plates 75, a horizontal upper support 79, parallel with the forward support 77, also joining the end plates 75, and a central curved glazing support 81 extending between the forward support 77 and the upper support 79. The terms "forward" and "upper" are used with respect to the closed position of the glazing cover 7. The end plates 75 have a radius of thirty inches. The central curved support 81 has the same radius of curvature as the end plates 75. The end plates 75 are cut out to provide sectoral openings 82.

The vertical edges of the 90° sector end plates 75 are provided with inward extensions 83 extending inwardly one-and-one-half inches from the end plates 75. The horizontal upper support 79 is three inches wide and extends inwardly one-and-one-half inches from the central glazing support.

The glazing 73 includes a rectangular piece of glazing 85 which is bent and attached to the outer curved faces of the end plates 75 and curved supports 81, and separate 90° sectors of glazing 86 attached to the outer faces of the end plates 75.

The glazing cover 7 is mounted to blocks 41 by hinges 87. One leaf of each hinge 87 is mounted to a block 41 and the other leaf is attached to the inward extension 83 on the glazing cover 7. The lower end of the inward extension 83 is cut away to accommodate the block 41.

The end plates 75 are spaced apart one inch farther than the length of the face plate 55, and the radius of the glazing cover is two inches greater than the height of the face plate 55. Therefore, the glazing cover 7 clears the face plate by one-half inch, and the inward extensions 83 and upper horizontal support 79 overlap the margin 57 by one inch and engage the gasket 59 when the glazing cover 7 is closed. The lower edge of the end plates 75 and the forward horizontal support 77 nest with the lip 39 and engage the gasket 40 on the sill 35 when the glazing cover is closed.

Figure 2:
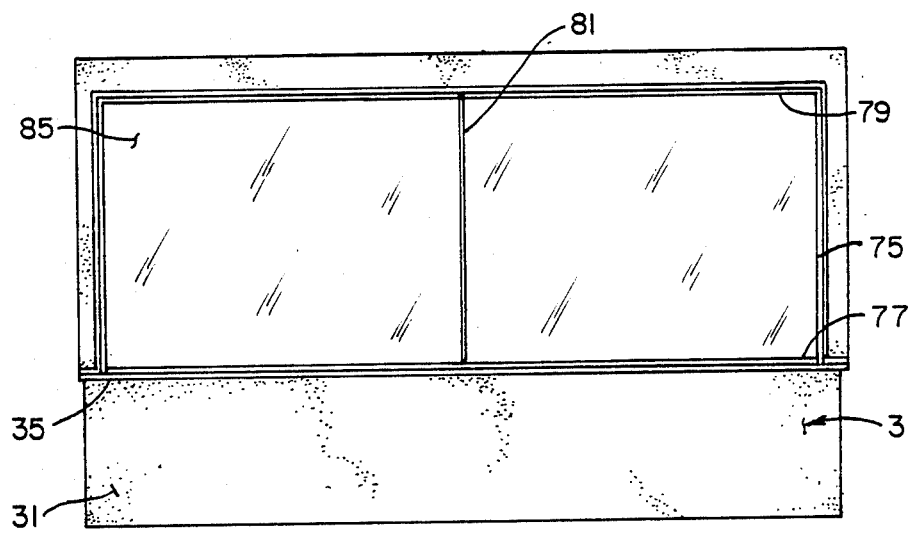
FIG. 2 is a view in front elevation of the cold frame of FIG. 1, showing the insulative cover in an open position, and the glazing cover in a closed postion.
Figures 3, 5:
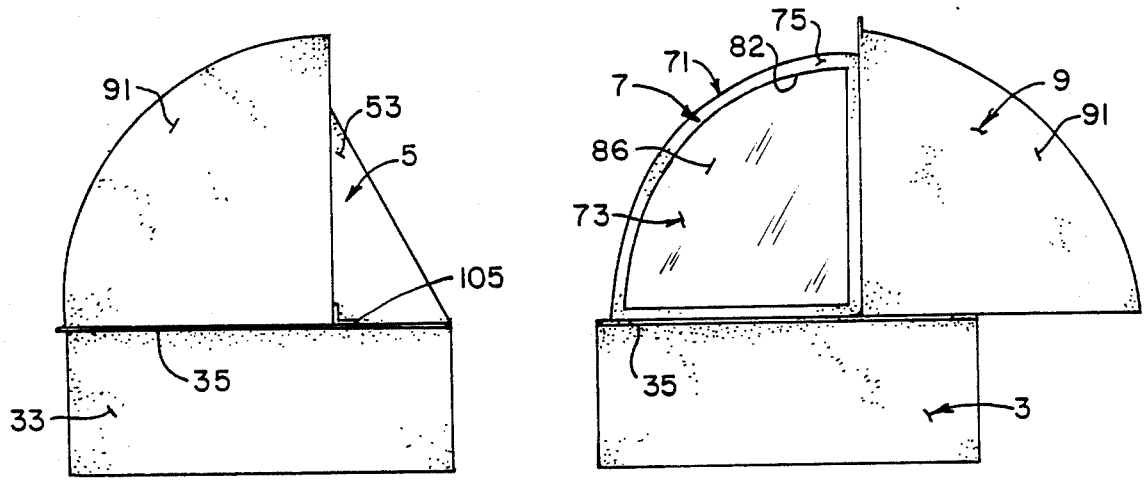
FIG. 3 is a view in right side elevation of the cold frame of FIGS. 1 and 2, showing the insulative cover and the glazing cover in the same position as in FIG. 2.
FIG. 5 is a view in right side elevation of the cold frame of FIGS. 1-4, corresponding to FIG. 3, showing both the insulative cover and the glazing cover in a closed position.

It will be seen that when the glazing cover 7 is in its closed position, as shown in FIGS. 2 and 3, it forms an air-tight enclosure with the box 3 and rear wall 5. The curvature of the glazing cover 7 provides far more height in the interior of the cold frame 1 than does a conventional cold frame, and therefore permits plants of greater size to be grown. The upwardly forwardly sloping rear wall 51 and side walls 53 reflect light onto the plants growing in the cold frame 1. The reflection of light is aided by the reflective surfaces of the insulation sheets 61 and 63.

When the glazing cover 7 is cracked open slightly, by rotating it slightly on hinges 87, a first opening is formed around the lip 39 on the front of the sill 35, and a second opening is formed around the margin 57 at the top of the face plate 55. An air path is therefore provided for flow-through ventilation, without opening the glazing frame 7 sufficiently to allow a strong wind to enter the cold frame 1 and freeze or otherwise damage the plants in the cold frame 1. The glazing cover 7 may be opened by a thermostatic opener 88 or simply held open by wood blocks 89. The thermostatic opener 88 should be adjusted to have a smaller throw than for a conventional cold frame.

When the glazing cover 7 is opened fully, the interior of the cold frame 1 is completely exposed to the ambient, although, particularly in summer, the forwardly sloping wall 51 may provide shade.

The insulated cover 9 is shaped as a quarter cylinder having dimensions sufficiently large to permit the glazing cover 7 to nest within it. The insulated cover 9 includes two 90° sector end plates 91 made from three-quarter inch pressure-treated plywood, a horizontal forward support 93 joining the end plates 91, a horizontal upper support 95, parallel with the forward support 93, also joining the end plates 75, and a curved rectangular sheet 97 mounted to the curved edges of the end plates 91. As with the description of the glazing cover 7, the relative positions of the parts are described with respect to the closed position of the insulated cover 9. The curved sheet 97 is preferably formed of corrugated fiberglass having sufficient stiffness to resist deflection over a span of eight feet. The curved sheet 97 provides resistance to water and hail.

The inside faces of 90° sector end plates 91 and curved rectangular sheet 97 are insulated with three inch thick waterproof foam insulation sheets 98 and 99, respectively.

The end plates 91 have a radius of thirty-five inches and have an inside spacing seven inches greater than the outer spacing between the end plates 75 of the glazing cover 7.

The vertical edges of the 90° sector end plates 91 are provided with inward extensions 101 extending inwardly five inches from the end plates 91. The horizontal upper support 95 is seven inches wide and extends inwardly one-and-one-half inches from the central glazing support. The horizontal forward support 93 is four inches wide, to acccommodate the insulation 99 and provide a half inch lip over the front wall 31 of the box 3, for lifting the insulated cover when it is in its closed position. Inward extensions 103 having a width of three inches to accommodate insulation sheets 98 and provide a tight seal with gasket 40 are provided on the lower edges of end plates 91.

The insulated cover 9 is mounted to sill 35 by hinges 105 spaced about one inch behind the hinges 87. One leaf of each hinge 105 is mounted directly to the sill 35 and the other leaf is attached to the inward extension 101 on the insulated cover 9.

It will be seen that the insulated cover 9 is sized to be spaced one inch from the curved glazing 85 of the glazing cover 7 and one-half inch from the end plates 75 of the glazing cover 7.

Figure 4:
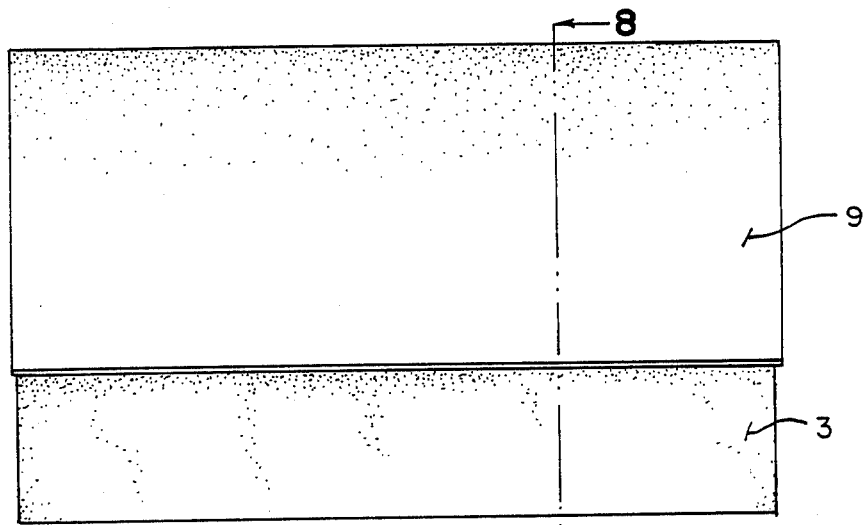
FIG. 4 is a view in front elevation of the cold frame of FIGS. 1-3, corresponding to FIG. 2, showing both the insulative cover and the glazing cover in a closed position.
Figure 6:
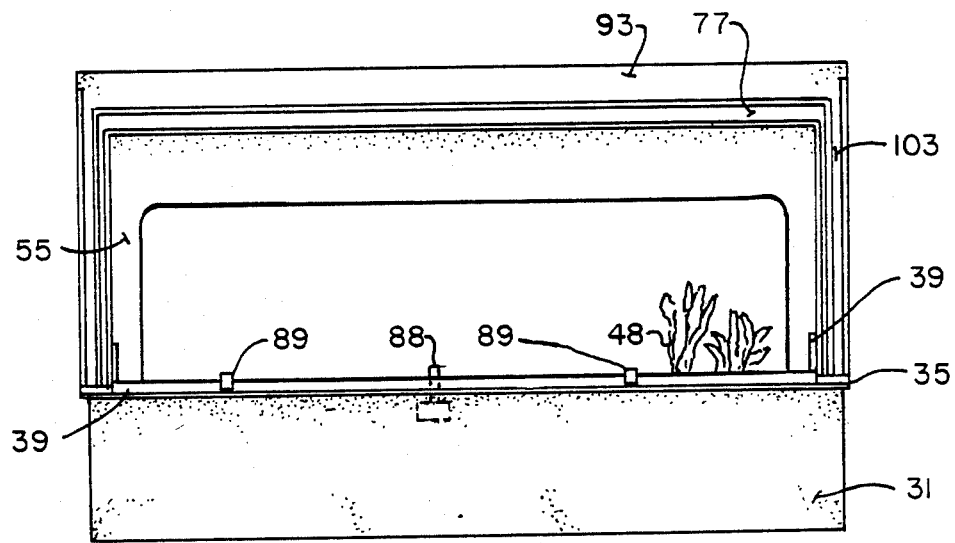
FIG. 6 is a view in front elevation of the cold frame of FIGS. 1-5, corresponding to FIGS. 2 and 4, showing both the insulative cover and the glazing cover in an open position.
Figure 8:
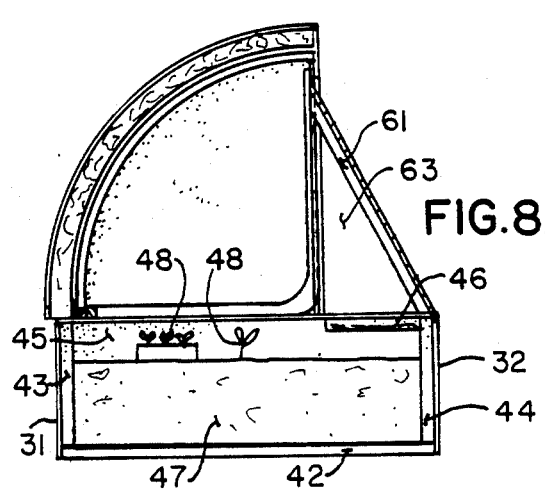
FIG. 8 is a sectional view taken along the line 8—8 of FIG. 4.
Figure 7:
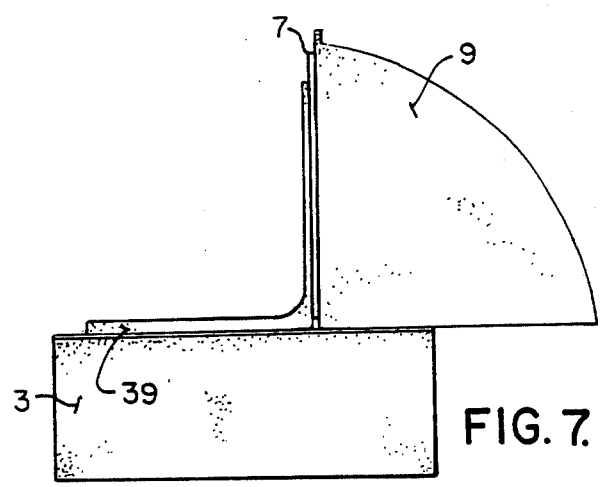
FIG. 7 is a view in right side elevation of the cold frame of FIGS. 1-6, corresponding to FIGS. 3 and 5, showing both the insulative cover and the glazing cover in an open position.

The extensions 101 and the lower edge of upper horizontal support 93 are sized to accommodate insulation 98 and provide an inwardly extending margin congruent with the inward extensions 83 and upper horizontal support 79 of the glazing cover 7. A gasket 107 is provided around the surface defined by the inward extensions 83 and upper horizontal support 79 of the glazing cover 7. When the glazing cover is in its closed position, as shown in FIGS. 4 and 5, it engages and compresses the gasket 107, to provide an airtight fit with the glazing cover 7, hence with the face plate 55.

The gasket 40 is sufficiently wide that it is engaged and compressed by the insulated cover 9 when it is closed, thereby providing a completely sealed and completely insulated chamber for the plants 48.

When the insulated cover 9 is opened, it is spaced from the curved glazing panel 85. Therefore, it does not interfere with flow-through ventilation when the glazing cover 7 is cracked open.

Although the device 1 has been described as a cold frame, it will be appreciated that it is in many respects wholly different from any previously known device. It permits plants to be grown in climates and seasons which would normally be far too severe. It permits plants to be started much earlier than normal and permits plants to be grown to maturity, if desired, in the device 1, year round.

The opening and closing of both the insulated frame and the glazing frame may be motorized and automated by the use of timers, sensors and computerized integrations of them. The device 1 is particularly well suited to automated sensing of such parameters as inside and outside temperature, humidity, soil moisture, and solar radiation. By the use of supplemental heat, light, and water, and computerized control of such supplemental sources and the covers, entire growth cycles may be automated.

During cold periods, the device 1 holds moisture and acts as a large terrarium, thereby reducing the need for watering. During much of the year it requires little human intervention beyond opening and closing one or both covers. Weeds, insects, and diseases are far easier to control than with conventional gardening systems. It is an ideal growth chamber both for bedding plants and for planting directly in a growth medium filling the box 3. Used in the latter way, it is a compact and efficient garden for a wide variety of crops, both in and out of season. It may be used for wintering tender perennials and for forcing bulbs.

For use during hot weather, it is desirable for the cold frame 1 to include a screen of air-permeable material. As shown in FIG. 14, the screen 111 may be carried by radially foldable ribs 113 mounted within and coaxially with the glazing frame 7. The upper edge of the screen 111 is held to the face plate, and the lower edge may be folded upwardly to provide access to the chamber. The screen 111 provides shade and keeps out insects, weed seeds, and stray pollen. The use of the screen 111 may significantly lengthen the growing season for cool weather crops.

Figure 15:
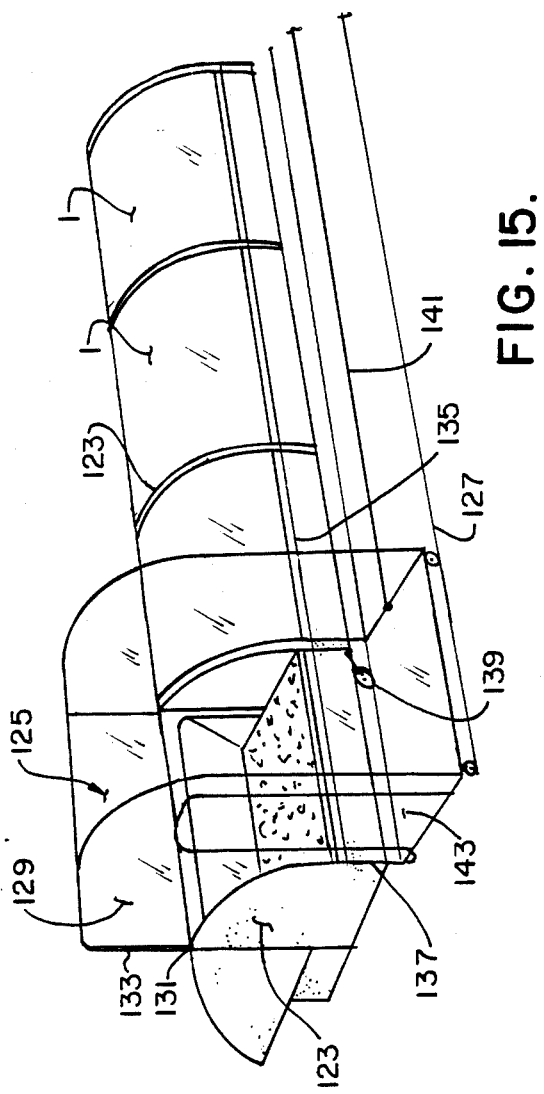
FIG. 15 is a view in perspective showing a plurality of cold frames of the present invention arranged end-to-end and serviced by an access pod.

Particularly during cold weather, it is desirable to have access to the interior of the cold frame 1 without permitting infiltration of ambient air. In the embodiment shown in FIG. 15, several cold frames 1 are mounted end-to-end in a row, with frames 123 between the cold frames 1 and at each end of the row. The front profiles of the frames 123 are circular arcs of slightly greater radius than the insulated covers 9. In this embodiment, the horizontal edges of the end plates 91 are provided with outward extensions which mate with lips on the frames 123 when the insulated covers are open. An access pod 125 is mounted on rails 127 along the front of the row of cold frames. The pod 125 is of sufficient size to hold a person. The pod 121 is shown as made of transparent material, for clarity, but the material of its construction is immaterial to the present invention. The pod 125 is provided with side walls 129 having a front profile which mates with the front face of the frames 123. A lower edge 131 of a front wall 133 of the pod 125 mates the top of the pod to insulated cover 9 in all positions of the cover 9. A horizontal rail 135 on the front wall 31 of box 3 provides a seal with a lower front wall 137 of the pod 125, thereby forming a sealed common interior space between the pod 125 and the interior of the cold frame 1 when the pod 125 is positioned in front of the cold frame 1. The pod 125 may be moved by means of winch 139 and cable 141 along the rails 127 from pod to pod. Access to pod 125 is gained through door 143.

Numerous variations, within the scope of the appended claims, will be apparent to those skilled in the art in light of the foregoing description and accompanying drawings. The materials, dimensions and relations of the parts may be varied, although the preferred embodiments provide a cold frame of a convenient size which may produce substantial quantities of plants, vegetables, fruits, or flowers. Other fill materials may be used. As previously noted, the cold frame 1 may be used for other purposes than growing plants, such as heating water in the manner of a so-called "bread box" water heater. These variations are merely illustrative.

I claim:

1. An insulated chamber comprising
    (a) an insulated box having an upper periphery,
    (b) a fixed, insulated upstanding rear wall on said box, said rear wall extending above the upper periphery of the box, and
    (c) an insulated cover moveable between
        (i) a closed position in which said insulated cover forms a seal with said upstanding rear wall and with said box to form a closed, insulated chamber, and (ii) an open position in which said upstanding rear wall is exposed to ambient light to reflect light into said box.

2. The insulated chamber of claim 1 wherein said upstanding rear wall slopes upwardly forward.

3. The insulated chamber of claim 1 further including
(d) a light-transmitting glazing cover within said insulated cover.

4. The insulated chamber of claim 3 wherein said glazing cover is substantially air-impermeable, said glazing cover being moveable between
    (i) a closed position in which said glazing cover forms a seal with said upstanding rear wall and with said box to form a closed chamber, and
    (ii) an open position in the interior of said box is exposed to ambient atmosphere.

5. The insulated chamber of claim 4 further including gasketing means, and wherein, when said insulated cover is closed, said glazing cover and said gasketing means are interposed between said insulated cover and said upstanding wall, and said gasketing means are interposed between said insulated cover and said insulated box.

6. The insulated chamber of claim 4 wherein said insulated cover is formed as a rigid section of a cylinder having a generally horizontal axis, and wherein said insulated cover is pivotable about said generally horizontal axis between said closed position and said open position.

7. The insulated chamber of claim 6 wherein said insulated cover includes a rigid, weather-resistant outer layer and an insulative inner layer.

8. The insulated chamber of claim 6 wherein said glazing cover is formed as a rigid section of a cylinder, and wherein said cover is pivotable about substantially the same axis as said insulated cover between said closed position and said open position, said glazing cover when partially opened providing a first opening between itself and said insulated box and a second opening between itself and said upstanding rear wall, thereby providing flow-through ventilation.

9. The insulated chamber of claim 1 further including growing plants in said chamber.

10. The insulated chamber of claim 9 wherein said box includes an insulated bottom, and wherein a heat-retaining material fills a substantial part of said box.

11. The insulated chamber of claim 9 further including a moveable pod of sufficient size to accommodate a human, said pod being mateable with said insulated chamber to close said chamber when said insulated cover is in said open position.

12. The insulated chamber of claim 11 further including at least one further such insulated chamber, wherein said chambers are aligned end-to-end and wherein said pod is continuously moveable across a front face of said chambers.

13. The insulated chamber of claim 1 wherein said insulated cover is formed as a rigid section of a cylinder having a generally horizontal axis, and wherein said cover is pivotable about said generally horizontal axis between said closed position and said open position.

14. An insulated chamber comprising
(a) an insulated box having an open top,
(b) a rigid, insulated cover moveable between a closed position in which said insulated cover closes said open top to form a closed, insulated chamber, and an open position, and
(c) a light-transmitting glazing cover within said insulated cover, said light-transmitting glazing cover being moveable, when said insulated cover is in said open position, between a closed position in which said glazing cover closes said open top and an open position in which the interior of said box is exposed to ambient atmosphere.

15. The insulated chamber of claim 14 wherein said glazing cover is substantially air-impermeable, said glazing cover in said closed position forming a seal with said box.

16. The insulated chamber of claim 15 wherein said insulated cover is formed as a rigid section of a cylinder having a generally horizontal axis, and wherein said insulated cover is pivotable about said generally horizontal axis between said closed position and said open position.

17. The insulated chamber of claim 15 further including
(d) an air-permeable screening cover within said glazing cover.

18. An insulated chamber, having an insulated cover moveable between a closed position and an open position and a glazing cover within said insulated cover, said glazing cover being moveable between a closed position and an open position, said chamber having a front face including said insulated cover and said glazing cover, and a pod of sufficient size to accommodate a human, said pod being mateable with said front face of said insulated chamber to close said chamber when said insulated cover and said glazing cover are in said open positions, said insulated cover and said glazing cover being reachable from said pod for opening and closing said insulated cover and said glazing cover from said pod, said pod being moveable away from said chamber front face to expose said insulated cover.

19. The chamber of claim 18 including a plurality of said chambers aligned end-to-end in a row, said pod being moveable along a track parallel with said row.

20. The chamber of claim 18 including heat-retaining material and growing plants in said chamber.

* * * * *